United States Patent
Mochizuki

(10) Patent No.: US 8,375,149 B2
(45) Date of Patent: *Feb. 12, 2013

(54) MEMORY CONTROLLER CONNECTED TO PLURAL VOLATILE MEMORIES AND DATA SAVING CONTROL METHOD OF THE SAME

(75) Inventor: Akihito Mochizuki, Narashino (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/450,277

(22) Filed: Apr. 18, 2012

(65) Prior Publication Data

US 2012/0203962 A1    Aug. 9, 2012

Related U.S. Application Data

(63) Continuation of application No. 12/870,537, filed on Aug. 27, 2010, now Pat. No. 8,190,788.

(30) Foreign Application Priority Data

Sep. 16, 2009    (JP) .................................. 2009-214980

(51) Int. Cl.
*G06F 3/00* (2006.01)
(52) U.S. Cl. ............................................. 710/8; 710/14
(58) Field of Classification Search .................. None
See application file for complete search history.

(56) References Cited

U.S. PATENT DOCUMENTS

| 7,990,797 B2 | 8/2011 | Moshayedi et al. |
| 2003/0235095 A1 | 12/2003 | Inoue |
| 2008/0270717 A1 | 10/2008 | Shaw et al. |
| 2010/0008175 A1 | 1/2010 | Sweere et al. |

FOREIGN PATENT DOCUMENTS

| EP | 0566306 A2 | 10/1993 |
| JP | 5-299616 A | 11/1993 |
| JP | 6-28267 A | 2/1994 |
| JP | 6-231053 A | 8/1994 |
| JP | 8-161236 A | 6/1996 |

*Primary Examiner* — Idriss N Alrobaye
*Assistant Examiner* — David Martinez
(74) *Attorney, Agent, or Firm* — Fitzpatrick, Cella, Harper & Scinto

(57) ABSTRACT

A memory controller that controls data transfer between a volatile memory and a non-volatile memory, wherein data being held in a plurality of volatile memories each having a refresh operation mode and a self-refresh operation mode is transferred to the non-volatile memory. When readout of data from at least one volatile memory has been finished, the volatile memory is shifted from the refresh operation mode to the self-refresh operation mode. Then, control is performed so as to return the volatile memory from the self-refresh operation mode depending on the progress of writing of data to the non-volatile memory.

11 Claims, 8 Drawing Sheets

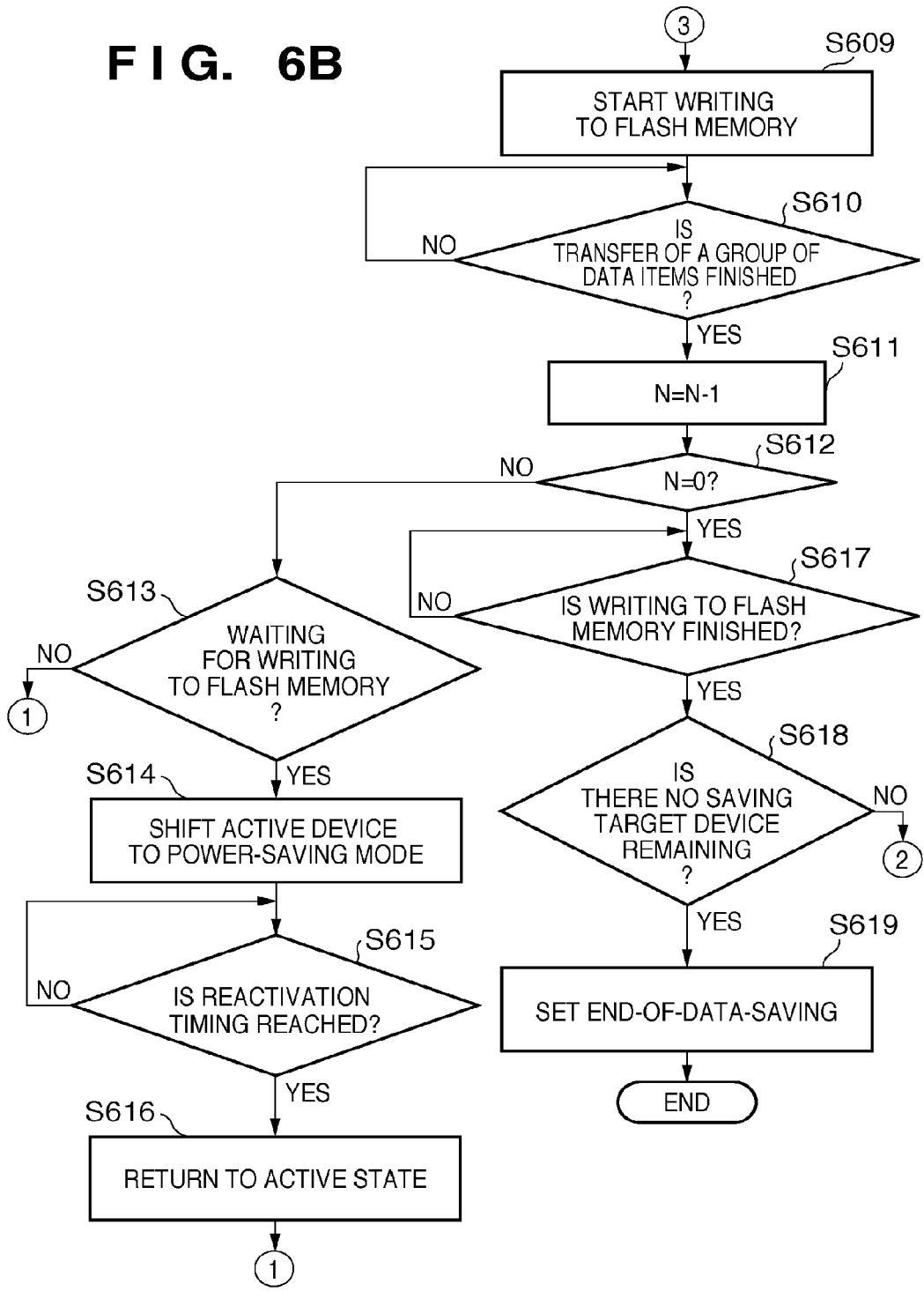

MEMORY CONTROLLER CONNECTED TO PLURAL VOLATILE MEMORIES AND DATA SAVING CONTROL METHOD OF THE SAME

This application is a continuation of U.S. application Ser. No. 12/870,537, filed Aug. 27, 2010, (allowed), the contents of which are incorporated by reference herein.

BACKGROUND OF THE INVENTION

1. Field of the Invention

The present invention relates to technology for data protection by transferring data being held in a volatile memory to a non-volatile memory.

2. Description of the Related Art

In apparatuses having a large capacity and requiring rapid data processing, a DRAM (dynamic RAM), which is a volatile memory, is generally used, and in recent years, a clock synchronous type thereof, that is, an SDRAM (synchronous DRAM) has become mainstream. In apparatuses that use such a volatile memory, there is a possibility that occurrence of an unexpected shutoff of power, such as a blackout, may cause a loss of data held in the memory and inflict a disadvantage on a user. Thus, technology for avoiding loss of data held in the memory under such conditions has been proposed.

Japanese Patent Laid-Open No. 08-161236 discloses a data loss avoiding method in which backup power is supplied to a volatile memory to allow the volatile memory to hold data and if the power supply voltage decreases to a predetermined level when power is shut off, the data held in the volatile memory is saved to a flash memory.

Moreover, Japanese Patent Laid-Open No. 06-028267 and Japanese Patent Laid-Open No. 06-231053 also disclose a method in which in order to similarly avoid a data loss, the power supply status is monitored and data is saved from a volatile memory to a non-volatile memory if it is determined that it is difficult to hold data.

In this manner, a highly reliable and practical apparatus has been realized by adopting a configuration in which a volatile memory that allows quick access is used during normal operation and, once an anomaly occurs and it becomes difficult to hold data, data whose loss would be inconvenient is saved to a flash memory.

However, in the case of saving data from the above-described DRAM to the flash memory, there is a necessity to supply backup power for ensuring operation until the completion of data transfer. This leads to a problem in that an increase in the amount of data to be saved results in an increase in the cost of a battery component serving as a source of the backup power.

In particular, since the DRAM, which is the source of transferred data, is required to continue a refresh operation for maintaining data until the saving is finished, and electric power expended for that operation increases with the data holding time, it is necessary that data saving be completed in as short a time as possible. On the other hand, the flash memory, which is the destination of saved data, has a very slow rewriting speed when compared with the readout speed from the DRAM. Thus, in the data saving operation as described above, writing to the flash memory is a bottleneck, and readout from the DRAM has to wait, which consequently makes it difficult to reduce electric power required to maintain data.

Furthermore, in recent years, with the improvement of system performance, the processing performance of a memory unit configured of a DRAM has been improved by increasing not only the operating speed but the data bus width. Since the increase in the data bus width is achieved by arranging and simultaneously operating a plurality of devices, the supply current required for operation increases with the number of devices. Therefore, the battery component used for the source of the above-described backup power is required to have a performance to cope with such increase in the supply current, and this has been a factor in a further cost increase.

SUMMARY OF THE INVENTION

The present invention provides a memory controller that suppresses the amount of electric power expended during a data saving operation from a volatile memory to a non-volatile memory and reduces the supply power required during the data saving operation as well as a data saving control method of the memory controller.

According to one aspect of the present invention, there is provided a memory controller that is connected to a volatile memory via a first bus and is connected to a non-volatile memory via a second bus and that controls data transfer from the volatile memory to the non-volatile memory, comprising: a data transfer unit that transfers data being held in a plurality of volatile memories operating in at least either a refresh operation mode or a self-refresh operation mode to the non-volatile memory; and a control unit that, when readout of data from at least one volatile memory by the data transfer unit has been finished, performs control so as to cause the volatile memory to shift from the refresh operation mode to the self-refresh operation mode.

According to another aspect of the present invention, there is provided a data saving control method of a memory controller that controls data transfer between a volatile memory and a non-volatile memory that are respectively connected to the memory controller via different buses, the method comprising: transferring data being held in a plurality of volatile memories each having a refresh operation mode and a self-refresh operation mode to a non-volatile memory; and performing control so that when readout of data from at least one volatile memory has been finished in the data transfer step, the volatile memory is shifted from the refresh operation mode to the self-refresh operation mode, and the volatile memory is returned from the self-refresh operation mode depending on the progress of writing of data to the non-volatile memory.

Further features of the present invention will become apparent from the following description of exemplary embodiments with reference to the attached drawings.

BRIEF DESCRIPTION OF THE DRAWINGS

FIGS. 6A and 6B are flowcharts showing a data saving process of the memory controller.

DESCRIPTION OF THE EMBODIMENTS

Hereinafter, embodiments of the present invention will be described in detail with reference to the drawings.

[First Embodiment]
Description of Configuration

Figure 1:
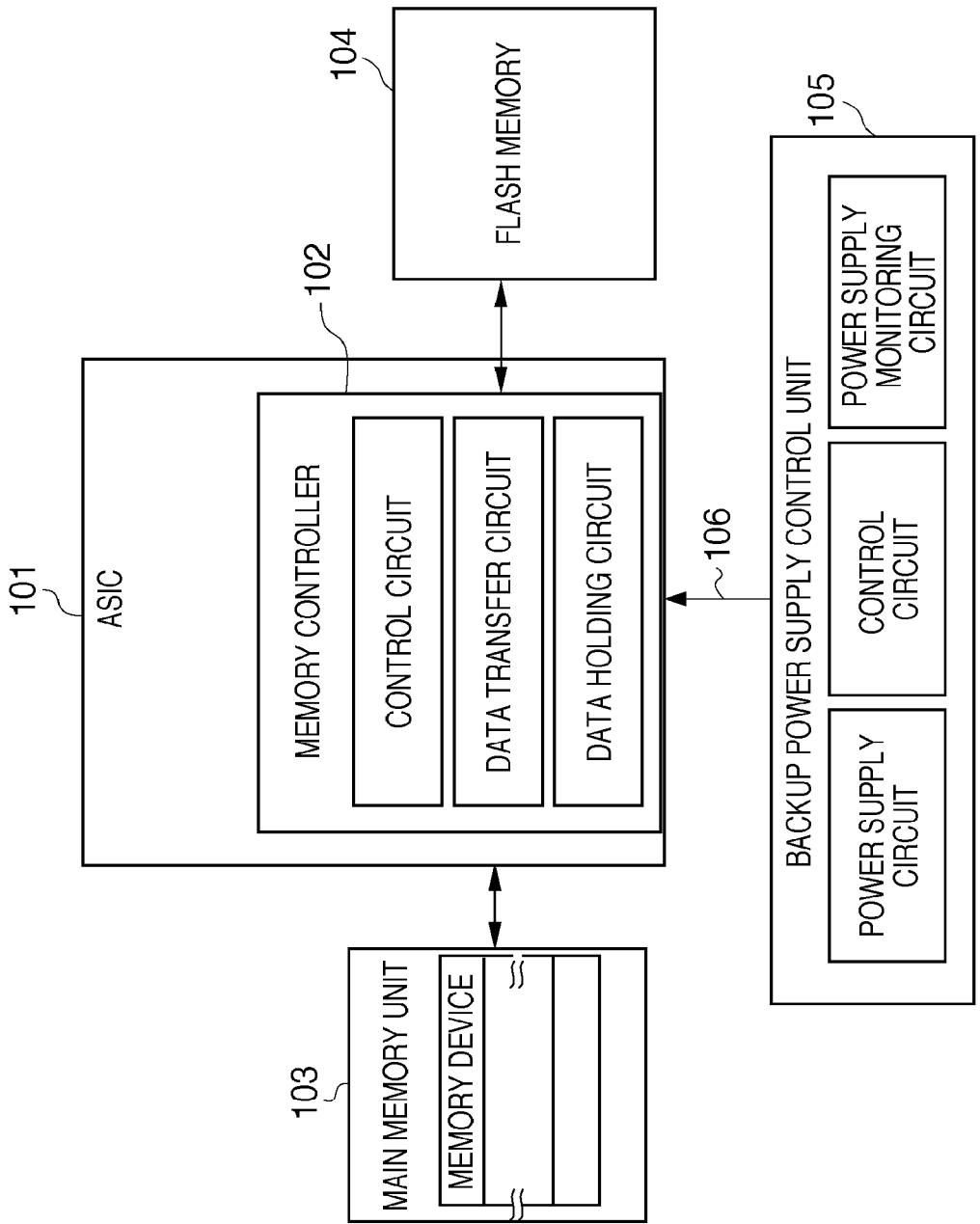
FIG. 1 is a block diagram showing an example of a circuit configuration to which a data saving control method of a first embodiment is applied.

FIG. 1 is a block diagram showing an example of a circuit configuration to which a data saving control method of a first embodiment is applied. As illustrated in FIG. 1, a memory controller 102 built in an ASIC 101 is connected to a main memory unit 103 configured of a plurality of memory devices and to a flash memory 104, which is a non-volatile memory, used for storage when saving data. In the embodiment, the memory devices will be described using SDRAMs (synchronous DRAMs), which are volatile memories, as an example.

The memory controller 102 includes a control circuit realized by a CPU, a gate array, a standard cell, or the like; a data transfer circuit such as a DMA; and a data holding circuit serving as a buffer. The memory controller 102 executes a data saving process whereby data in the main memory unit 103 is saved to the flash memory 104 in response to a signal 106 that requests a data saving operation from a backup power supply control unit 105.

The backup power supply control unit 105 includes an auxiliary power supply circuit for supplying power in place of a main power supply when the main power supply has been shut off. A component that is capable of controlling charge and discharge, such as a secondary battery or a capacitor component, is used as this power supply circuit and is controlled so as to provide for a shutoff of the main power supply by charging that component in advance when electric power is being supplied from the main power supply. Moreover, the backup power supply control unit 105 has a built-in power supply monitoring circuit for monitoring the voltage of the main power supply and detecting that the voltage has dropped to or below a predetermined level. The backup power supply control unit 105 further includes a control circuit that performs control so as to cause the auxiliary power supply circuit to supply power in place of the main power supply based on the result of detection by this power supply monitoring circuit.

The backup power supply control unit 105 monitors the voltage level of the main power supply and, upon detecting that the main power supply has been shut off, starts to supply power from the built-in power supply circuit in place of the main power supply. Moreover, upon detection of this shutoff of the main power supply, the backup power supply control unit 105 transmits the signal 106 that requests the data saving operation to the memory controller 102 of the ASIC 101.

Figure 2:
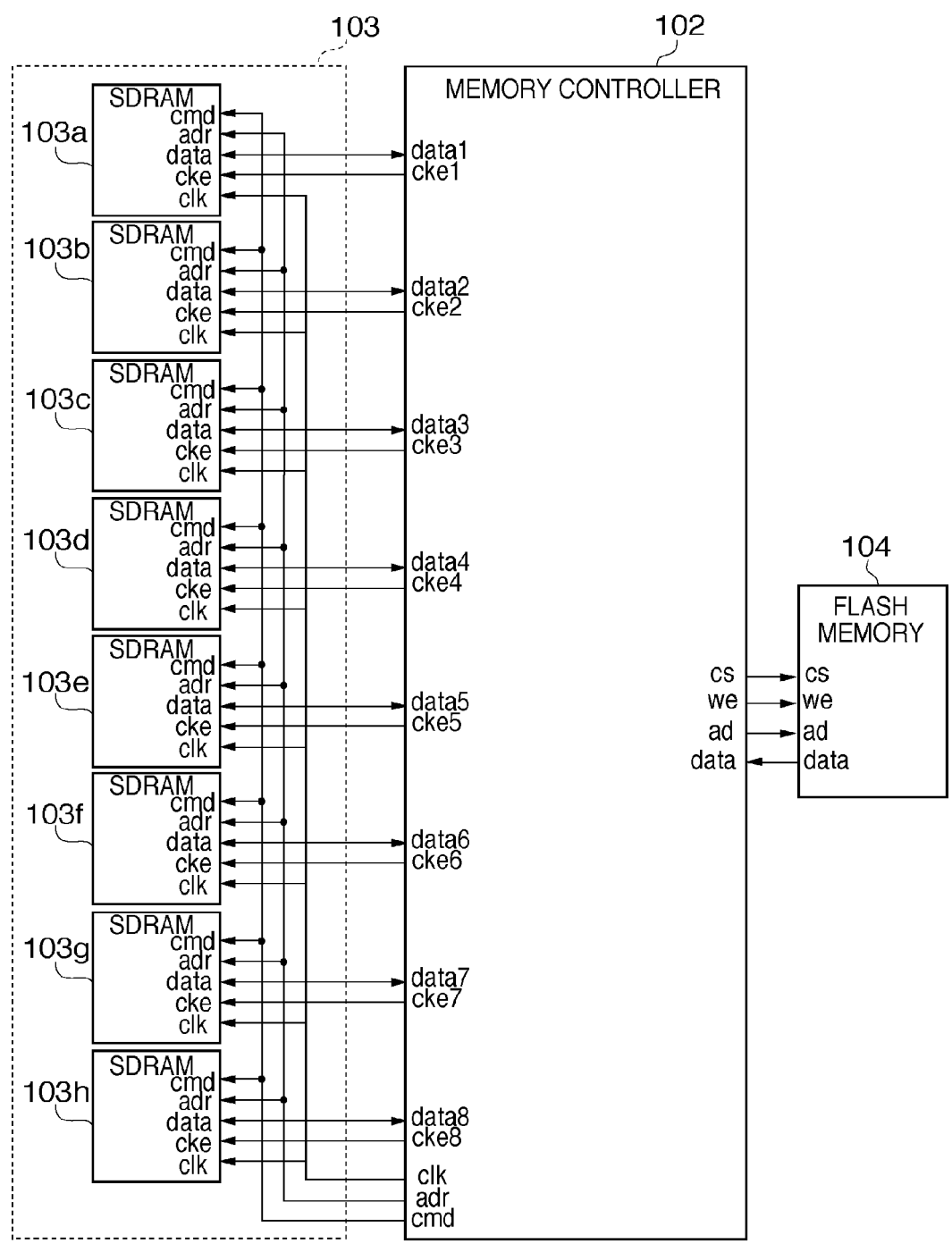
FIG. 2 is a block diagram showing an example of connection relationships between a memory controller and a main memory unit and a flash memory illustrated in FIG. 1.

FIG. 2 is a block diagram showing an example of connection relationships between the memory controller 102 and the main memory unit 103 and the flash memory 104 illustrated in FIG. 1. SDRAMs 103a to 103h have buses each having a data width of 8 bits (a first bus) and operate as a main memory unit 103 having a width of 64 bits in accordance with a control signal from the memory controller 102. Moreover, the flash memory 104 is a device having a bus with a data width of 8 bits (a second bus), and a sufficient write area for the amount of data to be saved from the SDRAMs of the main memory unit 103 is reserved therein.

In the above-described configuration, the memory controller 102 executes a data saving process sequence of reading out a predetermined amount of data being held in the main memory unit 103 and writing the data to the flash memory 104.

Moreover, the backup power supply control unit 105 provides an instruction to the memory controller 102 so as to activate or deactivate the plurality of SDRAMs depending on the progress of writing to the flash memory 104, thereby suppressing the supply power necessary for the data saving operation.

Here, a waiting time experienced in the above-described configuration during execution of data transfer from the main memory unit 103 will be described. Since the operating frequency of the SDRAMs is much higher than the operating frequency of the flash memory 104 and, furthermore, there is a significant difference in the data width between the SDRAMs and the flash memory 104 in the above-described configuration, the SDRAMs and the flash memory 104 greatly differ from each other in data transfer capability (corresponding to the throughput of the first bus and the second bus).

Therefore, during the data saving operation executed in such a configuration, a data readout operation from the main memory unit 103 is intermittently executed with respect to a writing operation to the flash memory 104, so that a "waiting time" occurs during which data transfer is not performed. The waiting time generated in the data saving process increases with the above-described difference in transfer capability, and even during the waiting time, the refresh operation must be executed in order for the main memory unit 103, which is a volatile memory, to continue to hold data.

The SDRAMs have two main types of refresh operation modes. One is a refresh operation mode for use in a situation where access is executed in a normal operation, and in order to hold data in an activated state, it is necessary to perform a specified number of refresh operations within a predetermined period of time. The other is a self-refresh operation mode in which the refresh operation is performed with the sole purpose of holding data without executing access to the SDRAMs. This self-refresh operation mode is a mode of operation that provides a function of automatically executing the refresh operation inside the SDRAMs. During operation in this self-refresh operation mode, it is possible to hold data on much less electric power than when activated by controlling an interface unit with the outside and other units that are necessary during access in a power-saving manner.

In the first embodiment, control is performed so that one SDRAM to be read is selected from among the SDRAMs 103a to 103h constituting the main memory unit 103 illustrated in FIG. 2 and is activated, while the other SDRAMs are shifted to the self-refresh operation mode. For example, a control signal is provided to each SDRAM from the memory controller 102 so as to set the SDRAM 103a as a target to be read and shift the other SDRAMs 103b to 103h to the self-refresh operation mode. Then, when the data saving operation of a predetermined number of data items has been finished, the next SDRAM 103b is returned from a deactivated state and the SDRAM 103a is conversely shifted to the deactivated state, and the data saving process is executed in the same manner.

The SDRAMs to be activated are sequentially switched in this manner to process all the data items to be saved. It should be noted that the data to be read out may be all the data items being held in the SDRAMs or may be some of them. For example, if the storage location and volume of data to be saved are fixed in advance, then during the saving operation, readout of data can be executed by specifying the starting address and data size of the corresponding area.

Moreover, even in the case where the storage location of data dynamically changes, information indicating the storage location can be stored each time, so that the area to be read out can be specified in the same manner during the saving operation. Furthermore, control can also be simplified by limiting the storage location of data to be saved to a specific SDRAM. For example, with respect to the 64-bit width main memory unit 103, by storing only 16 bits of data as effective data to be saved, the SDRAM switching control can be applied to only two SDRAMs. Furthermore, to preferentially save data of higher importance in order to improve the reliability of the saving process, SDRAMs serving as the storage locations can also be allocated in advance in order of priority.

Next, control of the shift to the deactivated state and return from the deactivated state of the SDRAMs will be described. The shift to the deactivated state and return from the deactivated state of the SDRAMs are controlled by a synchronizing clock signal indicated by "clk" and a clock enable signal indicated by "cke" illustrated in FIG. 2. Furthermore, the refresh operation mode is controlled by a command signal (predefined by a combination of signals such as RAS/CAS/WE) indicated by "cmd". According to the configuration in FIG. 2, it is possible to provide independent signals cke1 to cke8 to the SDRAMs 103*a* to 103*h* to individually control the shift to the deactivated state and return from the deactivated state.

Figure 3:
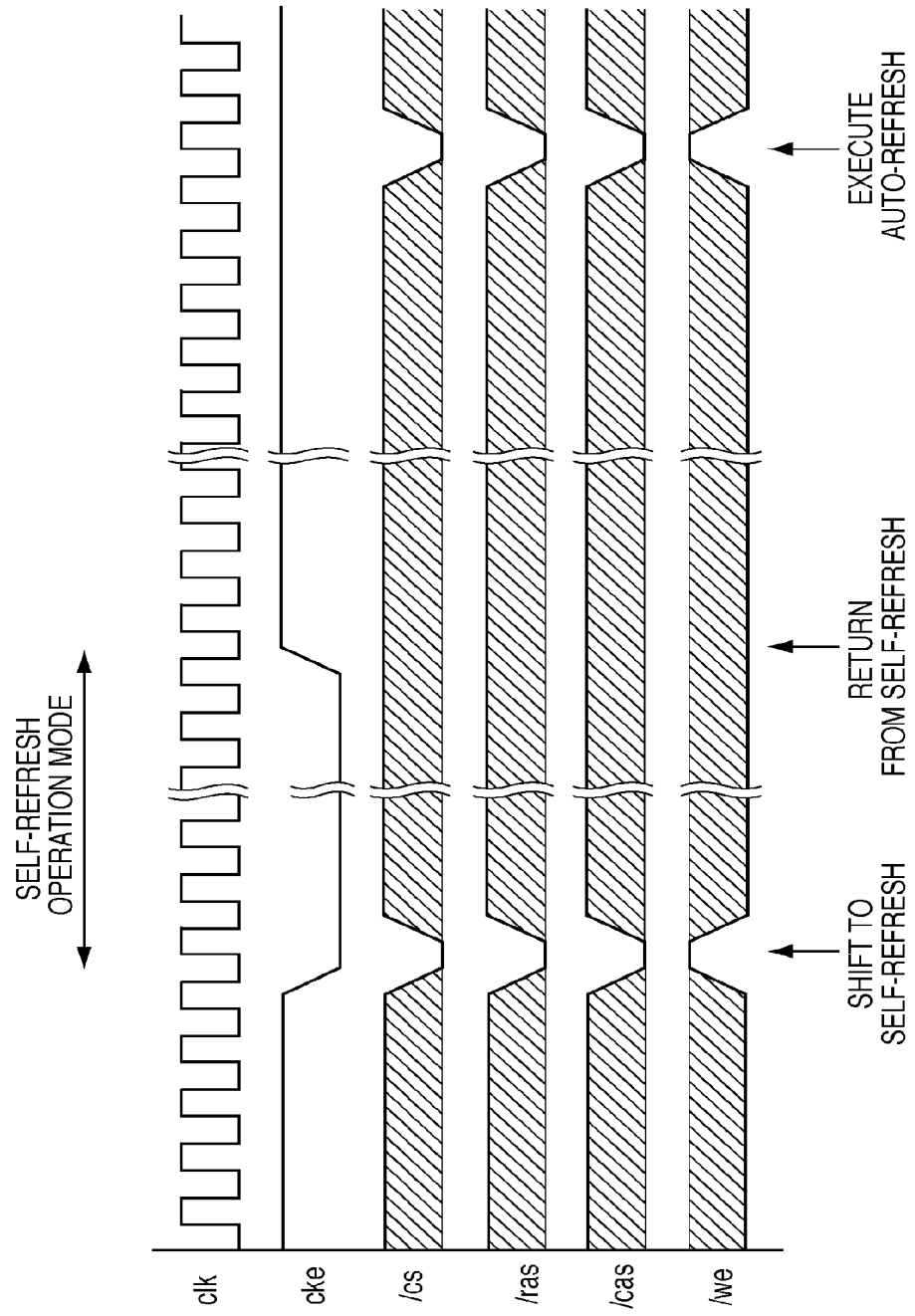
FIG. 3 is a timing chart showing an example of control of a self-refresh operation mode of an SDRAM.

FIG. 3 is a timing chart showing an example of control of the self-refresh operation mode of the SDRAMs. In FIG. 3, a self-refresh operation is started by a cke signal changing from a high level to a low level and a refresh command being simultaneously provided, and thereafter, this state is continued until the cke signal is changed back to the high level. If the cke signal is left at the high level, an auto-refresh operation is performed even when the same refresh command is issued. Therefore, in the configuration illustrated in FIG. 2, by controlling cke1 to cke8 in the above-described manner, it is possible to instruct a device to be shifted to the deactivated state to shift to self-refresh, and in the case of the activated state, instruct the auto-refresh operation. Although a configuration in which control signals other than the cke signal are provided in common is adopted in the first embodiment, a configuration may be adopted in which signals other than cke also are independently provided to each device.

Figure 4:
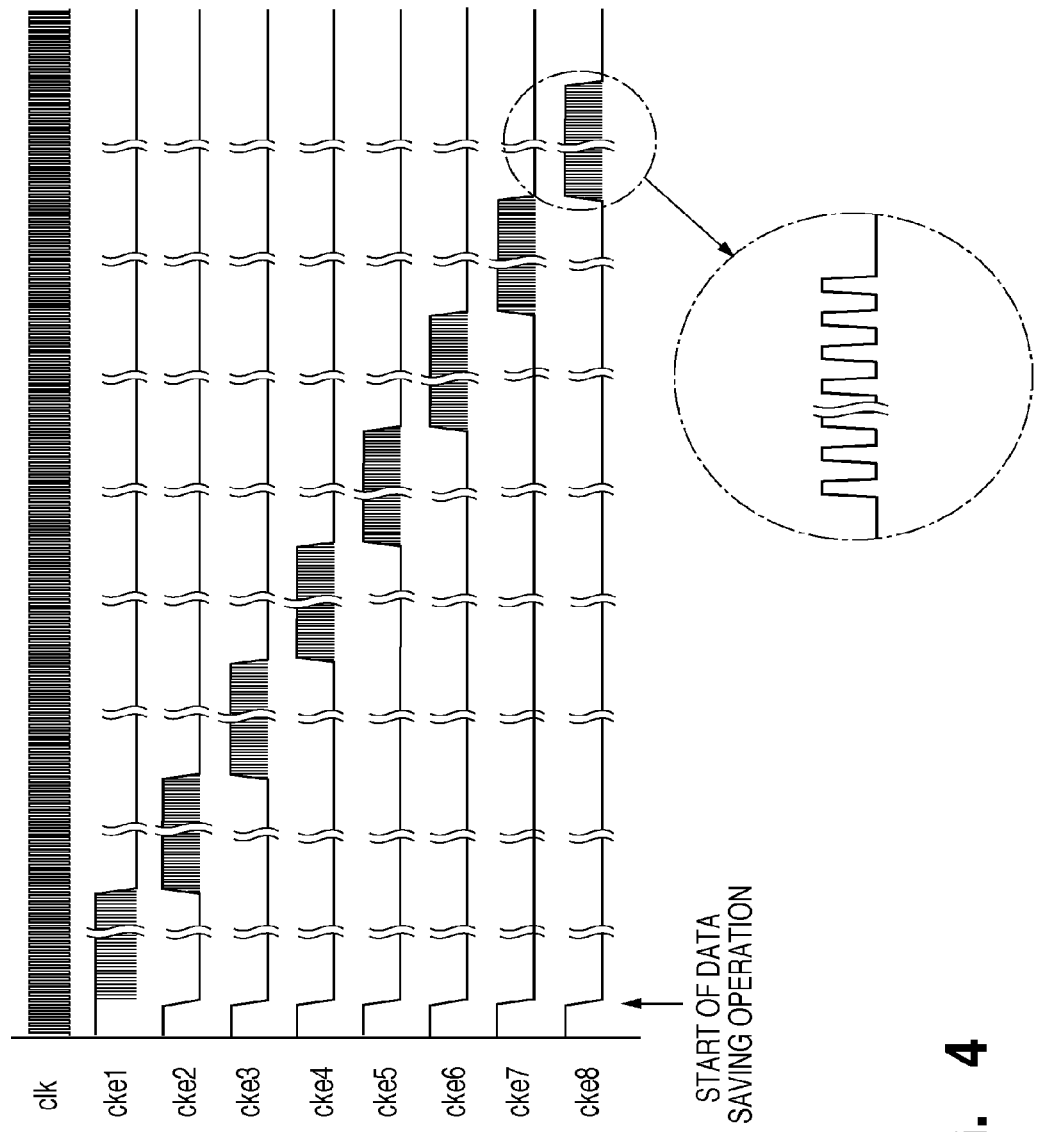
FIG. 4 is a timing chart showing an example of control of cke1 to cke8 provided to each SDRAM in a data saving operation.

FIG. 4 is a timing chart showing an example of control of cke1 to cke8 that are provided to the respective SDRAMs during the data saving operation. As described above, the main memory unit 103 illustrated in FIG. 2 is access-controlled using the width of 64 bits during normal operation, and at this time, all of cke1 to cke8 are at the high level. If the data saving operation is started based on the signal 106 that requests the data saving operation, all the cke signals excluding cke1, which is the control signal for the SDRAM 103*a* to be read first, are changed to the low level.

As a result, the SDRAMs shift to the self-refresh operation mode in which the SDRAMs continue to hold data in the deactivated state. Thereafter, cke1 to cke8 are driven as illustrated in FIG. 4 in accordance with the data saving operation that sequentially switches the target to be read, and thus the shift to the self-refresh operation mode and return from the self-refresh mode of each SDRAM are controlled.

Moreover, an enlarged portion enclosed by a circle illustrated in FIG. 4 shows that the shift to the self-refresh operation mode and return from the self-refresh mode are successively controlled even while an SDRAM to be read is being subjected to the saving operation (for example, the SDRAM is caused to transition to the self-refresh mode each time readout of an address line of the SDRAM is completed, and is returned from the self-refresh mode so as to prevent the occurrence of buffer underflow). This is an operation intended for power-saving control with respect to the above-described waiting time that is generated during execution of data transfer. Here, there is a difference in the power-saving effect per unit time between the case where an SDRAM is repeatedly shifted to the self-refresh mode at short time intervals while the saving operation is being performed on the SDRAM and the case where an SDRAM that is not designated when SDRAMs subjected to the saving operation are sequentially switched is maintained in the self-refresh mode for a long time. The reason for this is that when returning an SDRAM from the self-refresh mode, it is necessary to wait after the start of supply of a cke signal to the SDRAM until the behavior of the SDRAM is stabilized. Therefore, maintaining the self-refresh mode for a long time provides a higher power-saving efficiency. In the data saving operation, causing the flash memory 104 to execute rewriting at the shortest possible intervals depending on the rewriting speed thereof reduces the processing time and also leads to suppression of the electric power necessary for the saving process. For this reason, data transfer from an SDRAM to be read is controlled so that after a group of data items is collectively captured into and held in the ASIC 101, the data is transferred sequentially in blocks of 8 bits, that is, the data width of the flash memory 104. A burst read mode can be applied to this readout operation from the SDRAMs to rapidly execute data transfer.

As described above, in the data saving operation, the above-described waiting time is actively created by collectively holding data read out from the SDRAM in the buffer (the data holding circuit), and control is performed so that the SDRAM is caused to shift to the deactivated state during that waiting time.

It should be noted that in the above-described configuration, the eight SDRAMs illustrated in FIG. 2 are individually controlled and one of those SDRAMs is designated as the target to be read; however, the present invention is not limited only to this configuration, and the SDRAMs may be controlled in one or more groups. For example, it is also possible that the SDRAMs 103*a* to 103*h* are divided into two groups (103*a* to 103*d* and 103*e* to 103*h*) and each group is controlled individually. In this case, control can be more simplified than that of the above-described configuration because a cke signal can be assigned for each group. Moreover, the number of devices that are allowed to simultaneously operate during transfer is restricted to four. In this manner, the division into groups can be chosen depending on the device configuration used.

As described above, if rewriting of the flash memory 104 can be executed at the shortest intervals depending on the rewriting speed thereof, it is desirable to shift as many SDRAMs of the main memory unit 103 as possible to the deactivated state to suppress power consumption. Therefore, the division into groups can be chosen depending on the capability difference between the above-described readout operation from the main memory unit 103 and the writing operation to the flash memory 104. In the case where this capability difference is large, the division number may be increased to increase the number of devices to be deactivated.

Moreover, the division can be performed in such a manner that the number of SDRAMs that are allowed to simultaneously operate is restricted depending on the amount of current that can be supplied from the backup power supply control unit 105. The cost of the battery component serving as the source of the backup power increases with the current supply performance thereof, and therefore, cost reduction can also be achieved by suppressing the current supply that is required during the data saving operation.

Description of Operation

Figure 5:
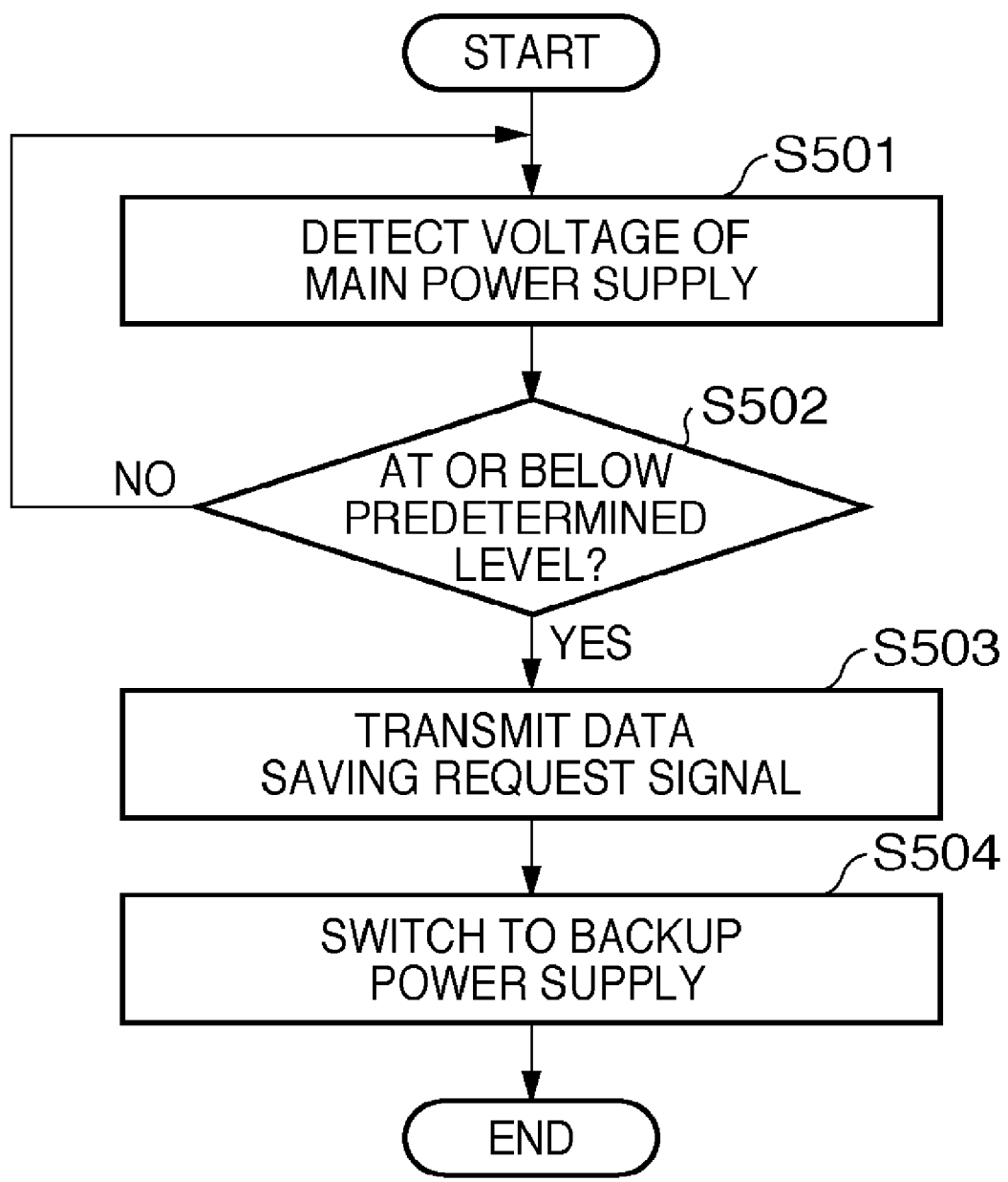
FIG. 5 is a flowchart showing an operation of a backup power supply control unit.

Here, the operation of the backup power supply control unit 105 that instructs the above-described data saving process will be described using FIG. 5. The power supply monitoring circuit detects the voltage level of the main power supply (step S501) and determines whether or not the voltage level has decreased to or below a predetermined level (step S502). If the result of determination is that the voltage of the main power supply is at or below the predetermined level, the control circuit transmits a signal that requests the data saving operation to notify the memory controller 102 of the ASIC 101 (step S503). Then, the control circuit switches to the power supply circuit serving as a backup power supply and starts auxiliary power supply (step S504).

Figure 6A:
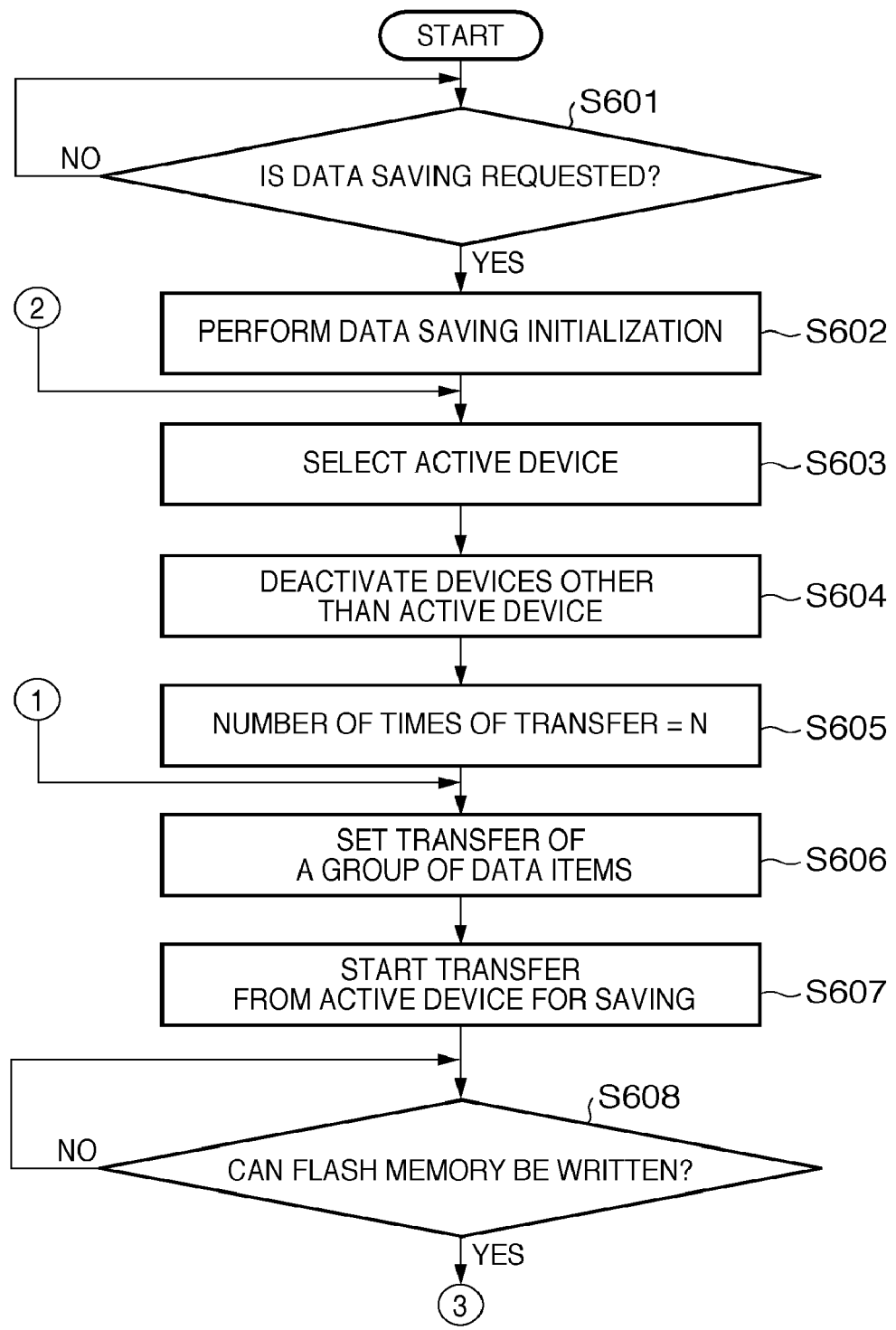

Next, the data saving process that the memory controller 102 executes based on the instruction from the backup power supply control unit 105 will be described using FIGS. 6A and 6B. First, if the memory controller 102 detects a request to start data saving due to the data saving request signal 106 transmitted from the backup power supply control unit 105 (step S601), initialization related to the data saving process is executed (step S602). Then, after the completion of initialization, the memory controller 102 starts the data saving operation from the main memory unit 103 to the flash memory 104.

Here, control is performed so as to activate only an SDRAM to be read during the data saving operation and cause the other SDRAMs to shift to the deactivated state. Here, among the SDRAMs 103a to 103h illustrated in FIG. 2, the SDRAM 103a is first selected as an active device (step S603). The other SDRAMs 103b to 103h are shifted to the self-refresh operation mode (step S604).

Next, the number of times N that transfer is to be executed is obtained based on the amount of data of a group of data items to be collectively captured from the SDRAM to be read (step S605). Then, information is provided to a DMA (not illustrated) so as to transfer this group of data items (step S606), and readout of data from the SDRAM to be read is started (step S607). On the other hand, writing to the flash memory 104 waits for the data read out from the SDRAM to be captured into the memory controller 102 (step S608), and is started immediately when the first data item captured becomes ready for writing (step S609).

In this manner readout from the SDRAM and writing to the flash memory 104 are executed in parallel. Readout from the SDRAM is continued until transfer of the group of data items having a predetermined amount of data is finished (step S610), and when the transfer has been finished, 1 is subtracted from N obtained in step S605 (step S611) to determine whether or not transfer has been executed N times (N=0 has been reached) (step S612). If the result of determination is that transfer has not yet been executed N times, it is determined whether or not to shift the SDRAM to the deactivated state based on the amount of data waiting for writing to the flash memory 104 (step S613). If the SDRAM has been caused to temporarily transition to the deactivated state (step S614), the timing of return from the deactivated state is determined depending on the progress of writing to the flash memory 104 (step S615). Then, the SDRAM is returned to the activated state before the start of the subsequent transfer (step S616), and the process returns to the above-described step S608.

It should be noted that the timing of return from the deactivated state is controlled so that, in order to duly execute writing to the flash memory 104, the SDRAM is returned to enable the start of transfer before there is a shortage of data. For example, the timing of return can be controlled by counting the number of data items written to the flash memory 104 and returning the SDRAM when a predetermined number is reached. Moreover, a timer for measuring the time calculated based on the cycle of writing to the flash memory 104 may be used.

On the other hand, if the result of determination in step 5612 is that transfer has been executed N times, the process waits until writing of the captured data to the flash memory 104 is finished (step S617). Afterward, when data saving from the SDRAM that has been selected as the target to be read has been completed by the above-described process of steps S603 through S617, it is checked whether an SDRAM that is the next to be read remains (step S618). Here, if such an SDRAM remains, the process returns to the above-described step S603, and the next target to be read is selected and then the process is repeated.

Moreover, if data saving from all the SDRAMs to be read has been completed, an end-of-data-saving is set (step S619), and this process is ended.

According to the first embodiment, a plurality of memory devices are individually controlled so as to restrict the number of memory devices that are allowed to simultaneously operate during the data saving operation, whereby it is possible to execute the data saving operation while suppressing the supply current. Therefore, the cost of the battery component used for the backup power supply for supplying electric power during the data saving operation can be reduced.

Second Embodiment

Next, a second embodiment according to the present invention will be described in detail with reference to the drawings. In the second embodiment, power consumption during operation is reduced by lowering the voltage supplied to an SDRAM serving as a memory device.

Figure 7:
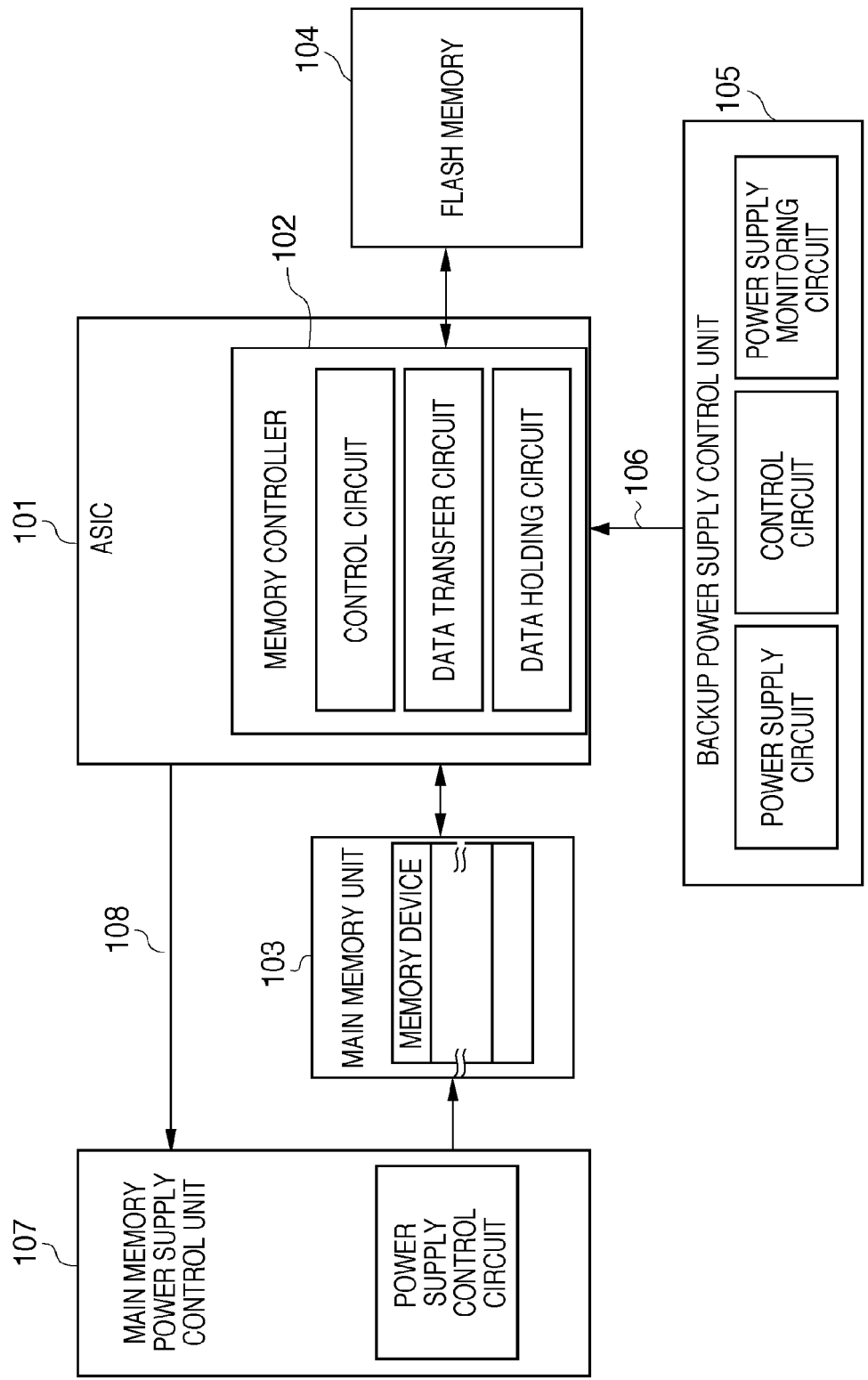
FIG. 7 is a block diagram showing an example of a circuit configuration to which a data saving control method of a second embodiment is applied.

FIG. 7 is a block diagram showing an example of a circuit configuration to which a data saving control method of the second embodiment is applied. The difference from the first embodiment illustrated in FIG. 1 is that a main memory power supply control unit 107 and a main memory power supply switching signal 108 are added.

The main memory power supply control unit 107 is configured of a power supply control circuit for controlling power supplied to the plurality of SDRAMs of the main memory unit 103. This power supply control circuit has a function of switching the supply voltage between two voltage levels: a voltage level during normal operation and a voltage level during the data saving operation. Moreover, the termination voltage of the SDRAMs is also controlled so as to change accordingly.

The main memory power supply switching signal 108 is a signal by which the memory controller 102 of the ASIC 101 notifies the main memory power supply control unit 107 of the data saving operation, and the main memory power supply control unit 107 changes the supply voltage based on this signal.

As described above, there is a significant difference in transfer capability between the readout operation from the main memory unit 103 and the writing operation to the flash memory 104, and so it is not necessary to access the main memory unit 103 at the speed for normal operation during the above-described data saving operation. For this reason, in the second embodiment, the voltage supplied to the SDRAMs is lowered to reduce power consumption during operation. Moreover, the memory controller 102 performs control so as to lower the operating frequency of the SDRAMs so that the speed of access to the SDRAMs is reduced, and thus a power saving during the data saving operation is realized.

Other Embodiments

Aspects of the present invention can also be realized by a computer (integrated circuitry) of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of
Japanese Patent Application No. 2009-214980, filed Sep. 16, 2009 which is hereby incorporated by reference herein in its entirety.

What is claimed is:

1. A memory controller that is connected to a plurality of volatile memories via a first bus and is connected to a storage unit via a second bus and that controls data transfer from each of the plurality of volatile memories to the storage unit, comprising:
  a data transfer unit that transfers data held in each of the plurality of volatile memories being able to operate in either a refresh operation mode or a self-refresh operation mode to the storage unit; and
  a control unit that, when readout of data from at least one volatile memory by the data transfer unit has been finished, performs control so as to cause the volatile memory to shift from the refresh operation mode to the self-refresh operation mode,
  wherein the control unit, in a first mode, supplies an enable signal to the plurality of volatile memories to read out data from the plurality of volatile memories, and in a second mode, supplies an enable signal to a part of the plurality of volatile memories and causes the volatile memories that are not supplied with the enable signal to transition to the self-refresh mode.

2. The memory controller according to claim 1, wherein the enable signal is supplied to a part of the plurality of volatile memories in which data to be saved is held.

3. The memory controller according to claim 1, wherein the control unit supplies the enable signal to another part of the plurality of volatile memories for saving the data of the plurality of volatile memories in the second mode.

4. The memory controller according to claim 3, wherein the progress of writing of data to the storage unit is determined by counting the number of data items written to the storage unit or by measuring a time calculated from the cycle of writing to the storage unit using a timer.

5. The memory controller according to claim 1, wherein a throughput of the first bus is greater than a throughput of the second bus.

6. The memory controller according to claim 1, wherein the first bus has a data width of 64 bits and the second bus has a data width of 8 bits.

7. The memory controller according to claim 1, wherein when power is supplied from a backup power supply for supplying power in place of a main power supply, data being held in the volatile memory is transferred to the storage unit by the data transfer unit and the control unit.

8. The memory controller according to claim 1, wherein transfer from the volatile memory to the storage unit by the data transfer unit is performed via a data holding unit provided inside the memory controller.

9. The memory controller according to claim 8, wherein data read out from the volatile memory is held in the data holding unit by the data transfer unit, and the held data is divided into blocks of a predetermined size and transferred to the storage unit.

10. The memory controller according to claim 1, wherein the control unit supplies the enable signal to the plurality of volatile memories one by one for saving the data of the plurality of volatile memories in the second mode.

11. A control method of a memory controller that is connected to a plurality of volatile memories via a first bus and is connected to a storage unit via a second bus and that controls data transfer from each of the plurality of volatile memories to the storage unit, the method comprising:
  transferring data held in each of the plurality of volatile memories being able to operate in either a refresh operation mode or a self-refresh operation mode to the storage unit; and
  performing, when readout of data from at least one volatile memory has been finished in the transferring step, control so as to cause the volatile memory to shift from the refresh operation mode to the self-refresh operation mode,
  wherein the control step, in a first mode, supplies an enable signal to the plurality of volatile memories to read out data from the plurality of volatile memories, and in a second mode, supplies an enable signal to a part of the plurality of volatile memories and causes the volatile memories that are not supplied with the enable signal to transition to the self-refresh mode.

* * * * *